F. NELSON.
Corn Sheller.
No. 111,139.          Patented Jan. 24, 1871.
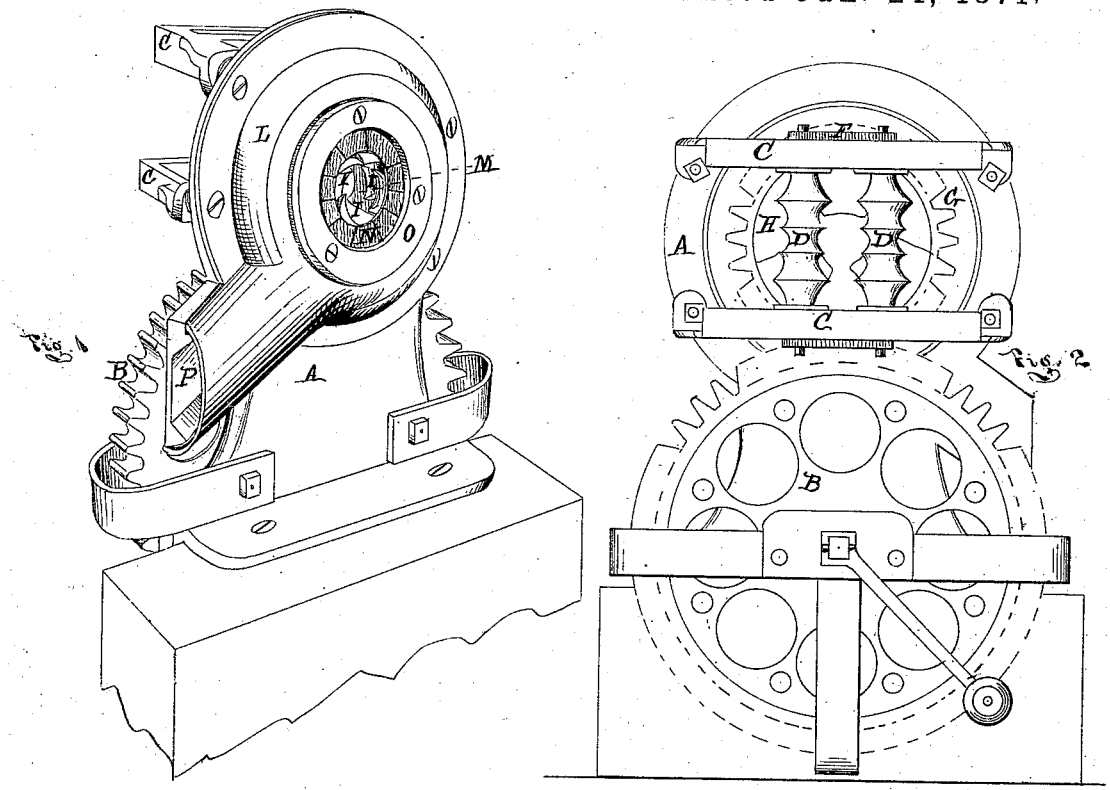
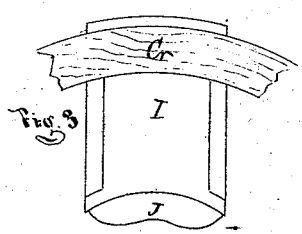
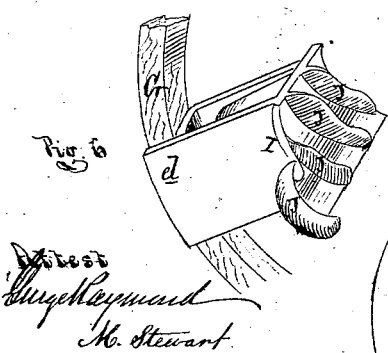
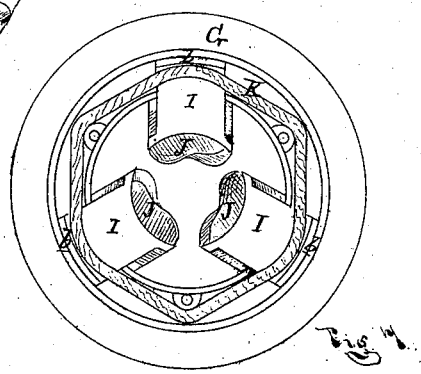
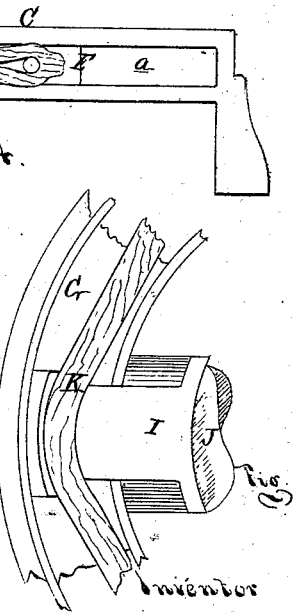

United States Patent Office.

FRANKLIN NELSON, OF WYANDOTTE, MICHIGAN, ASSIGNOR TO HIMSELF AND JOSEPH MASETH, OF SAME PLACE.

Letters Patent No. 111,139, dated January 24, 1871.

IMPROVEMENT IN CORN-SHELLERS.

The Schedule referred to in these Letters Patent and making part of the same.

*To whom it may concern:*

Be it known that I, FRANKLIN NELSON, of Wyandotte, in the county of Wayne and State of Michigan, have invented a new and useful Improvement in Corn-Shellers; and I do declare that the following is a true and accurate description thereof, reference being had to the accompanying drawing and to the letters of reference marked thereon and being a part of this specification, in which—

Figure 1 is a perspective from the rear.

Figure 2 is a front elevation.

Figure 3 is a plan of the shelling-teeth in the rear of the pinion, showing their position, with the elastic band for controlling their action.

Figure 4 is a plan of one of the slotted yokes which sustain the corrugated rollers for the discharge of the cob; also showing the elastic strap which controls their operation.

Figure 5 is a section showing one of the shelling-teeth and the manner of their attachment and operation.

Figure 6 is a perspective of one of the shelling-teeth.

Figure 7 is a plan of the upper part of the standard.

Like letters refer to like parts in each figure.

This invention relates to the construction of an implement for shelling corn from the cob, which will be effective in its work, easy of operation, not expensive to manufacture, and which will adapt itself automatically to any size of ears, while, at the same time, it will deliver the shelled corn and the cobs separately.

The invention consists—

First, in the improved construction and arrangement of its parts, all as hereinafter described and set forth.

Second, in the peculiar construction and arrangement of an India-rubber gasket, secured around the opening into which the ear of corn is introduced.

Third, in the combination of the above-named gasket with automatically adjustable corrugated rollers, for the purpose of holding the ear of corn during the process of stripping the same.

In the accompanying drawing—

A represents a standard, to which is secured the driving-wheel B, upon a suitable shaft which receives motion from a crank, pulley, or other suitable device.

To this standard are secured by suitable bolts the slotted yokes C.

The corrugated rollers D are vertically journaled at each end in the sliding boxes E, which traverse the slots *a* in the yokes.

Elastic straps F connect, at top and bottom, the rollers D.

A circular opening is left in casting the standard, within which rotates the ring G, to the front of which is bolted the pinion H, which receives motion from the driving-wheel B.

This ring is provided with three radial slots *b*, within which the shelling-teeth are secured in such a manner that they have a radial movement.

The shelling-teeth I are curved in their inner face, which is provided with vertical spiral flanges J, arranged in parallel lines, and the opposite ends of said teeth are provided with shoulders *d*, which fit into and have a radial movement in the slots *b* in the ring G.

An elastic ring, K, encircles the outer ends of the teeth and holds them in position to receive and shell the smallest ear, while the elasticity of the ring K allows said teeth to give and shell the larger ears.

L is a concave cap, which has an orifice, M, in its center, coincident with the center of the circular opening in the standard. This cap is bolted to the rear side of said standard, as shown.

A rubber gasket, N, severed radially on its inner edges, is secured around the orifice M by means of the ring O, which is bolted to the cap for the purpose.

In casting the cap and standard it should be so done that a channel, P, shall communicate with the opening in which the shelling-teeth rotate, for the purpose of carrying off the shelled corn.

The standard should be so constructed as to allow the device to be secured to any suitable bench, table, or bed.

Motion being given to the teeth by the crank, the small end of the ear of corn should be presented through the opening M, in the cap L, to the shelling-teeth I, when the spiral flanges J will strip the corn from the cob, drawing the ear forward as the corn is stripped from it.

The cob is delivered through and between the vertical corrugated rollers D, the elastic straps connecting which compel them to hug the cob and assist in drawing the same through the machine, while the shelled corn will be delivered through the channel or spout hereinbefore described.

The rubber gasket, hugging the ear as it enters, prevents any of the corn from falling at the rear of the device.

What I claim as my invention, and desire to secure by Letters Patent, is—

The improved corn-sheller herein described and shown, consisting of the standard A, driving-wheel B, slotted yokes C, corrugated rollers D, sliding boxes E, elastic straps F, ring G, pinion H, shelling-teeth I, elastic ring K, cap L, rubber gasket N, ring O, and spout P, when said parts are constructed, combined, and arranged to operate substantially as described and shown, for the purposes set forth.

FRANKLIN NELSON.

Witnesses:
THOS. S. SPRAGUE,
M. STEWART.